United States Patent
Mizuno et al.

[11] Patent Number: 6,011,605
[45] Date of Patent: Jan. 4, 2000

[54] LIQUID CRYSTAL DISPLAY WITH A METALLIC REFLECTING ELECTRODE HAVING A TWO LAYER FILM OF TI AND AL ALLOY

[75] Inventors: Hiroaki Mizuno, Kanazawa; Shingo Fujita, Ishikawa-gun; Takayuki Hatanaka; Tetsu Ogawa, both of Kanazawa, all of Japan

[73] Assignee: Matsushita Electric Industrial Co., Ltd., Osaka, Japan

[21] Appl. No.: 09/127,892

[22] Filed: Aug. 3, 1998

[30] Foreign Application Priority Data

Aug. 4, 1997 [JP] Japan ................................. 9-208902

[51] Int. Cl.[7] ........................ G02F 1/1335; G02F 1/1343
[52] U.S. Cl. ............................................. 349/113; 349/139
[58] Field of Search ...................................... 349/113, 149, 349/151, 152, 139

[56] References Cited

U.S. PATENT DOCUMENTS

| | | | |
|---|---|---|---|
| 5,287,208 | 2/1994 | Shimoto et al. | 359/75 |
| 5,528,403 | 6/1996 | Kawaguchi et al. | 359/88 |
| 5,535,030 | 7/1996 | Ogura et al. | 359/74 |
| 5,583,676 | 12/1996 | Akiyama et al. | 349/28 |
| 5,684,551 | 11/1997 | Nakamura et al. | 349/99 |
| 5,811,318 | 9/1998 | Kweon | 349/152 |
| 5,818,552 | 10/1998 | Sato | 349/43 |
| 5,822,030 | 10/1998 | Uchiyama | 349/149 |
| 5,825,437 | 10/1998 | Seo et al. | 349/46 |
| 5,843,341 | 12/1998 | Orita et al. | 349/139 |
| 5,847,789 | 12/1998 | Nakamura et al. | 349/99 |

FOREIGN PATENT DOCUMENTS

| | | |
|---|---|---|
| 0467659 | 1/1992 | European Pat. Off. |
| 0617310 | 9/1994 | European Pat. Off. |
| 0731507 | 9/1996 | European Pat. Off. |
| 0740188 | 10/1996 | European Pat. Off. |
| 0782040 | 7/1997 | European Pat. Off. |
| 57-042022 | 3/1982 | Japan. |
| 57-113265 | 7/1982 | Japan. |

*Primary Examiner*—William L. Sikes
*Assistant Examiner*—Heidi L. Eisenhut
*Attorney, Agent, or Firm*—Smith, Gambrell & Russell, LLP

[57] ABSTRACT

A reflection type liquid crystal display apparatus has a liquid cell having an upper substrate having an electrode pattern formed with transparent electrodes, a lower substrate opposed to the upper substrate and having an electrode pattern formed with metallic reflecting electrodes, an orientation film formed on each of the two electrode patterns, and containing liquid crystal put between the upper and lower substrates, and an electronic part connected to the liquid crystal cell and used to drive the liquid crystal cell, wherein each of the metallic reflecting electrodes is a two-layer film composed of Ti and Al alloy and formed on the lower substrate.

6 Claims, 6 Drawing Sheets

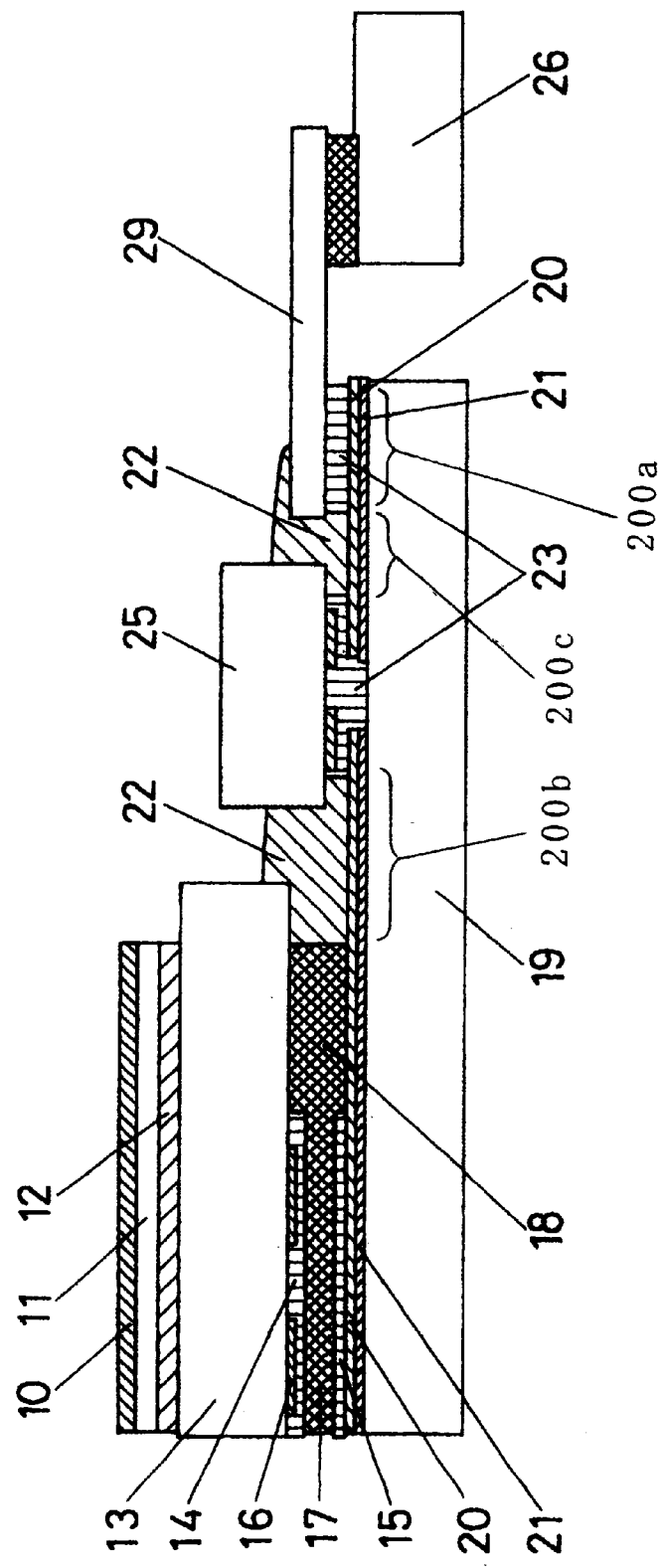

LIQUID CRYSTAL DISPLAY WITH A METALLIC REFLECTING ELECTRODE HAVING A TWO LAYER FILM OF TI AND AL ALLOY

BACKGROUND OF THE INVENTION

1. Field of the Invention

The present invention relates to a reflection type liquid crystal display apparatus provided with reflecting electrodes.

2. Related Art of the Invention

A related art reflection type liquid crystal display apparatus is used in the TN or STN mode. The display apparatus is composed of a liquid crystal cell holding liquid crystal between two substrates on each of which transparent electrodes are formed; a pair of polarizing plates disposed so as to put this liquid crystal cell therebetween; and a reflecting plate disposed outside the polarizing plate of the lower substrate. In this configuration, however, a light passes through this pair of polarizing plates 4 times, so the display is dark. The transmittance of a light per polarizing plate is about 45% at the highest. At this time, the transmittance of a polarized light in parallel to the absorbing axis of the polarizing plate is almost 0% and the transmittance of vertically polarized light is almost 90%. In this configuration, therefore, the reflectance is found as follows; $(0.9)^4 \times 50\% = 32.8\%$. The maximum reflectance will thus be about 33% even for a monochrome panel. Especially, in the case of a color liquid crystal display panel for which color filters are formed on one substrate in a monochrome panel configuration, the display will be darker than a monochrome panel, since the light is absorbed by the color filters. This is why it will become difficult to obtain a satisfactory brightness for a reflecting display.

In order to make the display brighter in such a configuration, there have been made some propositions so far. For example, only the upper polarizing plate is used on the liquid crystal cell and the liquid crystal cell is put between this polarizing plate and a reflecting plate (as disclosed in Unexamined Published Japanese Patent Application Nos. 07-146469 and 07-84252). In such a case, the light passes the polarizing plate only twice, so the reflectance per monochrome panel becomes $(0.9)^2 \times 50\% = 40.5\%$. When compared with a two-polarizing-plate configuration, it can be expected that the reflectance is improved by about 23.5%.

Another proposition was to make the display brighter using a PCGH mode reflection type liquid crystal display panel (refer to H. Seki: 1996SID, P.614SID96DIGEST). In this case, no polarizing plate is used. The reflectance per monochrome panel is about 66% in this configuration and the display will become brighter than any of the above configurations.

When only one polarizing plate is used or when no polarizing plate is used as described above, metallic reflecting electrodes are formed on the lower substrate so that each of them is used as both a reflecting plate and an electrode, and a reflecting plate is disposed in the liquid crystal cell. This is to solve a parallax problem caused by the thickness of the substrate provided between the reflecting plate and the liquid crystal. An Al or Ag metallic material, which is low in wiring resistance and high in reflectance, is used for the metallic reflecting electrodes. The Ag material is expensive, but the Al material is used as a material of integrated circuits for general semiconductor devices (used to form elements on an Si wafer, for example). The Al material will thus be practical as a material of such metallic reflecting electrodes.

It is sure that a pure Al material is low in resistance and the most excellent as a metallic reflecting electrode material. When such an Al material is used for metallic reflecting electrodes, however, stress migration and electro-migration problems cannot be avoided. (The stress migration problem here means blistering (HIROKKU) of a thin film and wire breaking caused by a stress mainly in a heating process. The electro-migration means thin-film-like-wire breaking caused by electrical migration mainly at a power on operation (especially, a power-on operation under a high humidity and a high temperature).)

In order to solve the above problems, there have been developed various Al alloys usable as the above Al material. However, any of such Al alloys have not obtained resistance to stress migration and electro-migration enough to solve the above problems, since their resistance is increased and their reflectance is reduced.

SUMMARY OF THE INVENTION

Under such circumstances, it is an object of the present invention to provide a reflection type liquid crystal display apparatus that uses a metallic reflecting electrode, which can obtain a high reliability, since the material of the metallic reflecting electrode is low in wiring resistance, high in reflectance of display electrodes, and excellent in resistance to each of stress migration, electro-migration, and corrosion.

The reflection type liquid crystal display apparatus of the present invention comprises a liquid cell having an upper substrate having an electrode pattern formed with transparent electrodes, a lower substrate opposed to said upper substrate and having an electrode pattern formed with metallic reflecting electrodes, an orientation film formed on each of said two electrode patterns, and containing liquid crystal put between said upper and lower substrates, and an electronic part connected to said liquid crystal cell and used to drive said liquid crystal cell, wherein each of said metallic reflecting electrodes is a two-layer film composed of Ti and Al alloy and formed on said lower substrate.

According to the reflection type liquid crystal display apparatus of the present invention composed as described above, the resistance to each of stress migration, electro-migration, and corrosion can be improved significantly.

Furthermore, since electrodes are formed on an $SiO_2$-film-formed soda-lime glass on each of the two substrates respectively, low-price glass substrates can be employed for the display apparatus of the present invention.

And, at least one of Zr, Ti, and Ta components should preferably be mixed by 0.1 at % to 5 at % in the Al alloy. If such a configuration is taken, the resistance to each of stress migration, electro-migration, and corrosion in the Al alloy material itself of the metallic reflecting electrodes will be improved more and it will be possible to provide excellent properties (low resistance of wiring, high reflectance of display electrodes) to the reflection type liquid crystal display apparatus.

Furthermore, in the case of the electrodes of the liquid crystal cell composed as described above, an exposed electrode portion between an electrode to which the electronic part is connected and each display electrode is covered with resin. And, the resin covering the exposed portion should preferably be acrylic resin. Consequently, the resistance to each of electro-migration and corrosion will be improved more on the surface of each electrode at the exposed portion of and between electrode patterns in the reflection type liquid crystal display apparatus of the present invention.

BRIEF DESCRIPTION OF THE DRAWINGS

FIG. 6 is a cross sectional view of the reflection type liquid crystal display apparatus in the second embodiment of the present invention.

DESCRIPTION OF THE NUMERALS

10 ... POLARIZING PLATE 11 ... POLYMER MOLECULAR FILM 12 ... SCATTERING FILM 13 ... UPPER SUBSTRATE 14, 15 ... ORIENTATION FILM 16 ... TRANSPARENT ELECTRODE 17 ... LIQUID CRYSTAL 18 ... SEALING MEMBER 19 ... LOWER SUBSTRATE 20 ... Al ALLOY ELECTRODE 21 ... Ti ELECTRODE 22 ... ACRYLIC RESIGN 23 ... ANISOTROPIC CONDUCTIVE BINDING MATERIAL 24 ... TAB TAPE CARRIER 25 ... LSI CHIP 26 ... PRINTED BOARD 27 ... $SiO_2$ FILM 28 ... SODA-LIME GLASS SUBSTRATE 29 ... FLEXIBLE SUBSTRATE

PREFERRED EMBODIMENTS OF THE INVENTION

Hereunder, some preferred embodiments of the present invention will be described with reference to FIGS. 1 to 6.

(First Embodiment)

Figure 1:
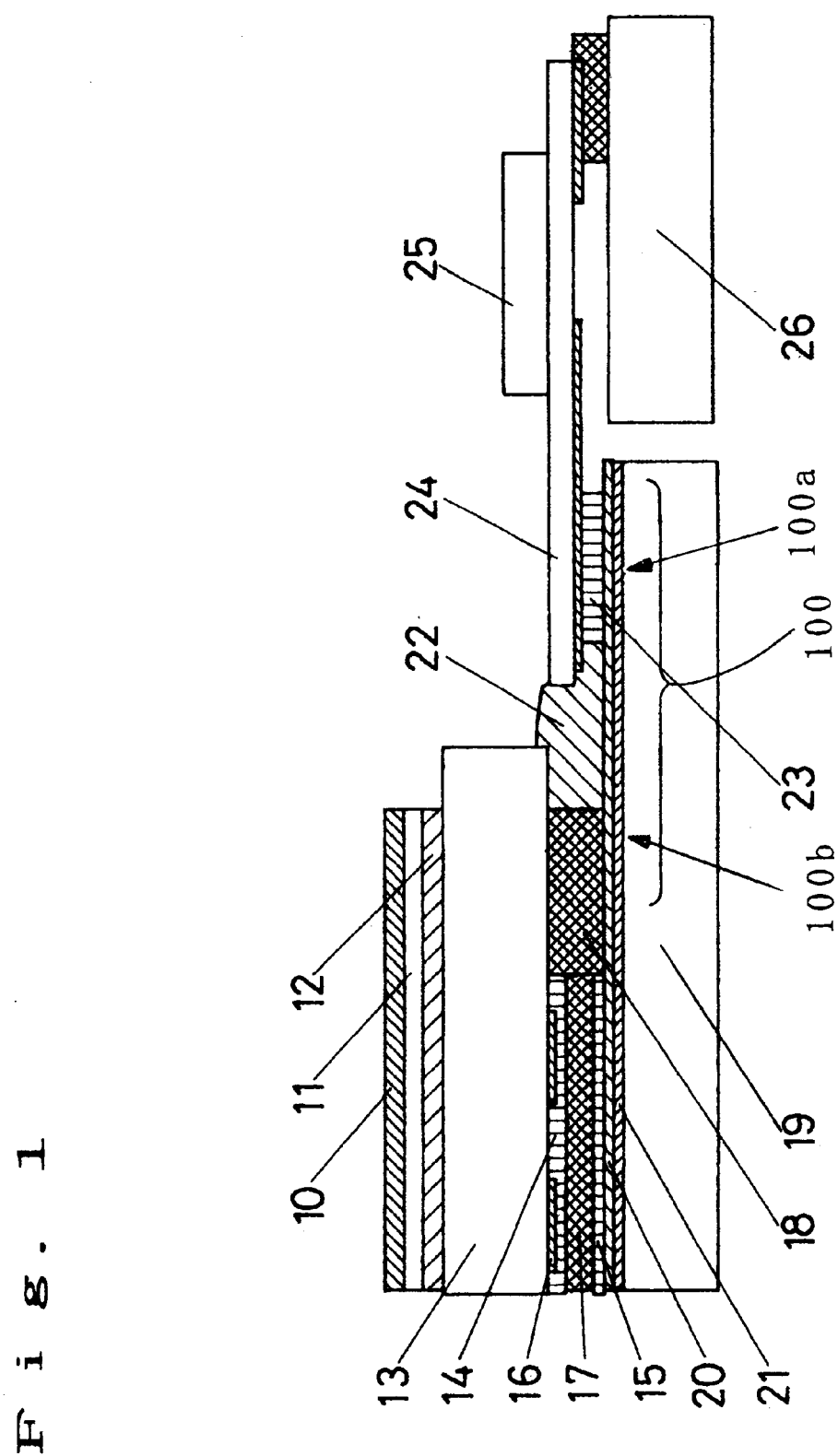
FIG. 1 is a cross sectional view of a reflection type liquid crystal display apparatus in the first embodiment of the present invention.

FIG. 1 is a cross sectional view of the reflection type liquid crystal display apparatus in the first embodiment of the present invention. A reference numeral 10 indicates a polarizing plate, 11 indicates a polymer molecular film, 12 indicates a scattering film, and 13 indicates an upper substrate. And, 14 and 15 indicate orientation films. 16 indicates a transparent electrode, 17 indicates liquid crystal, 18 indicates a sealing member, and 19 indicates a lower substrate. 20 indicates an Al alloy electrode and 21 indicates a Ti electrode. Next, 22 indicates acrylic resin and 23 indicates anisotropic binding material. Then, 24 indicates a TAB tape carrier and 25 indicates an LSI chip. Also, 26 indicates a printed board.

Figure 2:
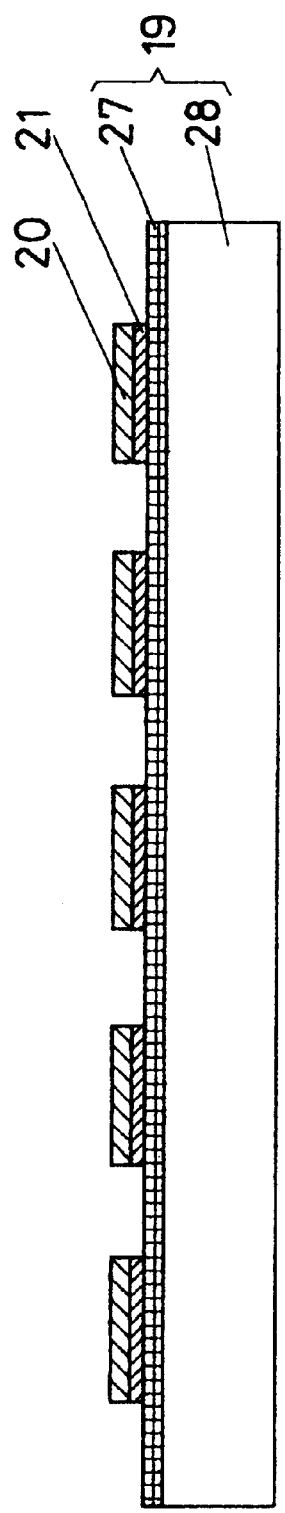
FIG. 2 illustrates how metallic reflecting electrodes are formed on the lower substrate in the first embodiment of the present invention.

FIG. 2 is a cross sectional view indicating how Al alloy electrodes 20 and Ti electrodes 21 are formed on the lower substrate 19 shown in FIG. 1. The electrodes 20 are metallic reflecting electrodes. Reference 28 indicates a soda-lime glass substrate and 27 indicates an $SiO_2$ film. The reason why such an $SiO_2$ film is formed on the soda-lime glass substrate 28 is to prevent alkali from eluting into the liquid crystal. On this lower substrate 19 were laminated a Ti film 21 of 500 Å and an Al alloy film 20 of 2000 Å in order. Then, the same electrode patterns were formed by this two-layer film thereby to form two-layer film mirror reflection type metallic reflecting electrodes. On this lower substrate 19 was not formed any thin film active component such as a transistor.

Furthermore, just like the lower substrate 19, the upper substrate 13 was composed of a soda-lime glass substrate on which an $SiO_2$ film was formed. On the upper substrate 13 were formed transparent electrodes 16 with indium stannum oxide. No thin film active component such as a transistor was formed on this upper substrate 13.

A 5 wt % solution of polyimide N-methyl-2-pyrrolidinone was printed on both upper substrate 13 and lower substrate 19 on each of which electrodes were formed. Then, the surfaces of the substrates 13 and 19 were cured at 200° C. and an orientating treatment was carried out to form orientation films 14 and 15 using rayon cloth under the control of the rotation rubbing method so as to materialize a 250° twisted STN mode liquid crystal.

After this, thermal hardening sealing resin 18 mixed with 1.0 wt % glass fiber of 5.5 cm in diameter was printed at the periphery on the upper substrate 13. On the lower substrate 19 was dispersed resin beads of 5.0 μm in diameter at a rate of 200 pieces/$mm^2$. Then, the upper and lower substrates 13 and 19 were put together and the sealing resin was cured at 150° C. After this, liquid crystal obtained by mixing a predetermined amount of chiral liquid crystal with ester nematic liquid crystal of $\Delta n_{LC}$=0.16 was charged in vacuum between the substrates 13 and 19, then sealed with ultraviolet curing resin and cured with ultraviolet rays.

A scattering film 12 was formed on the upper substrate 13 of the liquid crystal cell formed such way. The scattering film 12 was a forward scattering film (product name: Lumisty) manufactured by Sumitomo Kagaku Kogyo (Co., Ltd.) and the scattering angle of the scattering film was 0° to 50° when measured from the film normal. On the scattering film was stuck a polymer molecular film 11 composed of polycarbonate. The polymer molecular film 11 was composed of two polymer molecular films, each having a lag phase axis different from the other. The lag phase axis of the polymer molecular film at the liquid crystal cell side was 90° against the orientating direction of the upper substrate when the retardation was 0.3 μm and the lag axis of the upper polymer molecular film was 45° against the orientating direction of the upper substrate 13 when the retardation was 0.5 μm. In addition, an anti-glare (AG) neutral gray polarizing plate (SQ-1852AP (Sumitomo Kagaku Kogyo Co., Ltd.)) was stuck on the film as a polarizing plate 10 so that the absorbing axis was aligned to the lower lag axis.

Furthermore, a parts-mounted printed board 26 and a TAB tape carrier 24 on which an LSI chip 25 is mounted were used as electronic parts for driving the liquid crystal cell and they were connected to each other. In addition, the electrodes 20 and 21 of the liquid crystal cell were extended thereby to compose an extended portion 100. The tip 100a of the extended portion 100 was then connected to one end of the TAB tape carrier using an anisotropic conductive binding material 23.

Furthermore, part 100b of the extended portion 100 was covered with acrylic resin 22 so that the extended portion 100 of the electrodes 20 and 21 was not exposed. In other words, the portion 100b between the tip 100a of the extended portion 100 and a sealing member 18 was covered with acrylic resin 22 (TUFFY (TF1141) Hitachi Kasei Kogyo Co., Ltd.).

This configuration has obtained a reflection type liquid crystal display apparatus in the normal back mode, which can display black as an achromatic color at a low reflectance, white as an achromatic color at a high reflectance, and vary the display from black to white as an achromatic color in the normally black mode respectively while the display is driven at a simple matrix of a 1/240 duty ratio.

Tests were then performed as follows for such a reflection type liquid crystal display apparatus to check the resistance to stress migration, the resistance to electro-migration, the resistance to corrosion, the reflectance, and the specific resistance of the metallic reflecting electrodes when the content of each of Zr, Ti, and Ta (components of the Al alloy electrode 20) of the metallic reflecting electrodes was varied from 0 at % to over 5 at %.

EXAMPLE 1

A sample of this test was formed by laminating a Ti film of 500 Å and an Al alloy film of 2000 Å on an $SiO_2$-film-formed soda-lime glass substrate in order using the DC magnetron spattering method and using an Al alloy target in which the content of each of Zr, Ti, and Ta components was varied from 0 at % to over 5 at %, and a Ti target. Then, same pattern electrodes were formed in this two-layer film as two-layer mirror reflection metallic reflecting electrodes.

Figure 3:
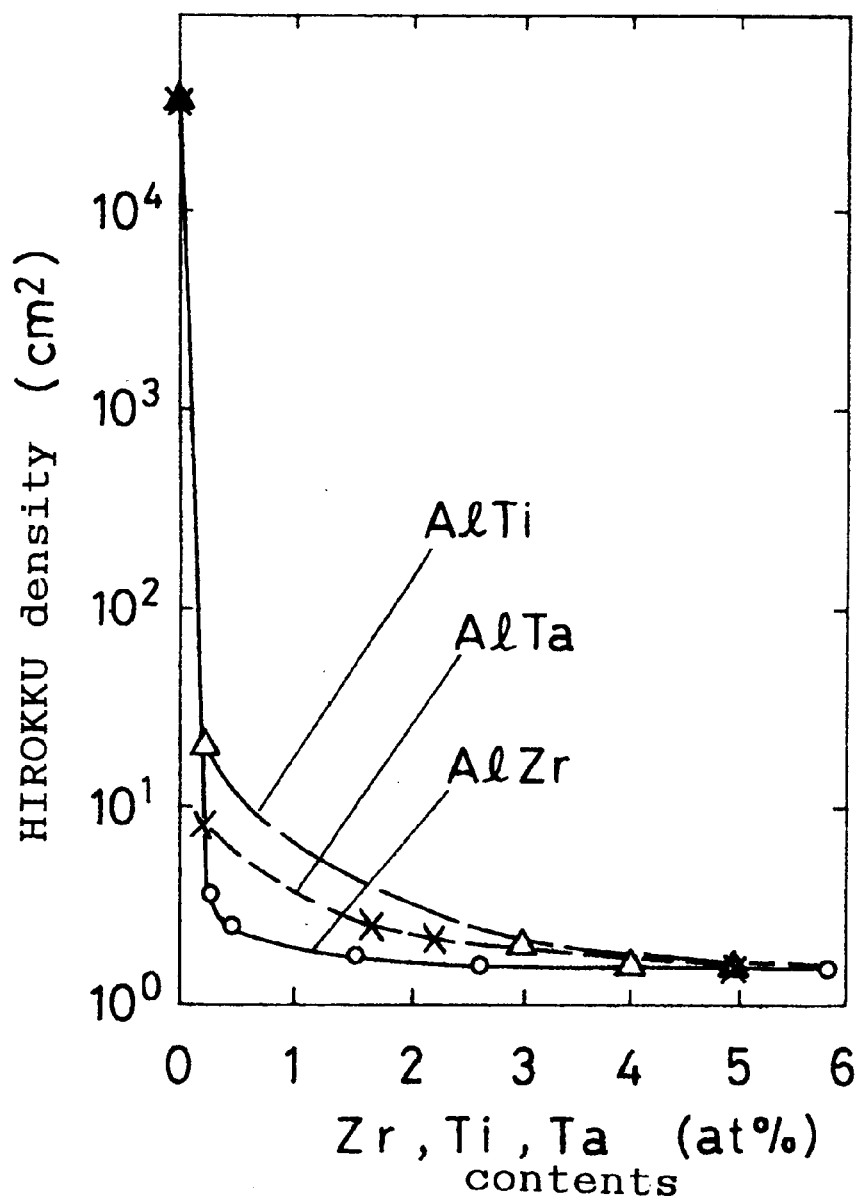
FIG. 3 illustrates the relationship among the Zr, Ti, and Ta contents and the HIROKKU density in the Al alloy film in the first embodiment of the present invention.

The above sample was heated in air at 200° C. for an hour, then the number of HIROKKUs generated on the surface of the stripe pattern were counted to find the HIROKKU density. FIG. 3 shows the result. When each of Zr, Ti, and Ta was added by 0.1 at % or over, the HIROKKU density was reduced significantly and the resistance to stress migration was improved more.

Furthermore, a PCT (Pressure Cooker Test: temperature; 105° C., pressure; 1.2 atm, and humidity; 100% RH) was performed for the sample as an environmental acceleration test thereby to evaluate the corrosion resistance of the sample film. 60 hours after the PCT test was ended, the surface of the sample was discolored when the alloy content was 0 at %, that is, at a pure Al metallic reflecting electrode. When the content of the alloy was within 0.1 at % to over 5 at %, no abnormality was recognized on the surface. This test result thus proved that the corrosion resistance was improved when each of Zr, Ti, and Ta was added by 0.1 at % or over.

Furthermore, a conducting test was carried out for the reflection type liquid crystal display apparatus composed shown in FIG. 1 using the above metallic reflecting electrodes. The conducting test was continued for 500 hours at a temperature of 60° C. and a humidity of 90% RH to evaluate the resistance to electro-migration of the electrodes. When the content of each of Zr, Ti, and Ta in the alloy was 0 at %, that is, when each electrode was a pure Al metallic reflecting electrode, wire breaking occurred. When the content was between 0.1 at % and over 5 at %, no abnormality including wire breaking was recognized, even on the surface of the sample. This result thus proved that the resistance to electro-migration was improved when each of Zr, Ti, and Ta was added by 0.1 at % or over.

The test result has therefore proved that when the content of each of Zr, Ti, and Ta was between 0.1 at % and over 5 at % in the Al alloy of the metallic electrodes composed as described above, the resistance to stress migration, the resistance to electro-migration, and the resistance to corrosion were improved respectively. The present invention can thus provide a highly reliable reflection type liquid crystal display apparatus. The effect as described above can also be obtained even when the alloy contains two or more of Zr, Ti, and Ta components concurrently and the total amount of the contents is between 0.1 at % and over 5 at %.

EXAMPLE 2

Figure 4:
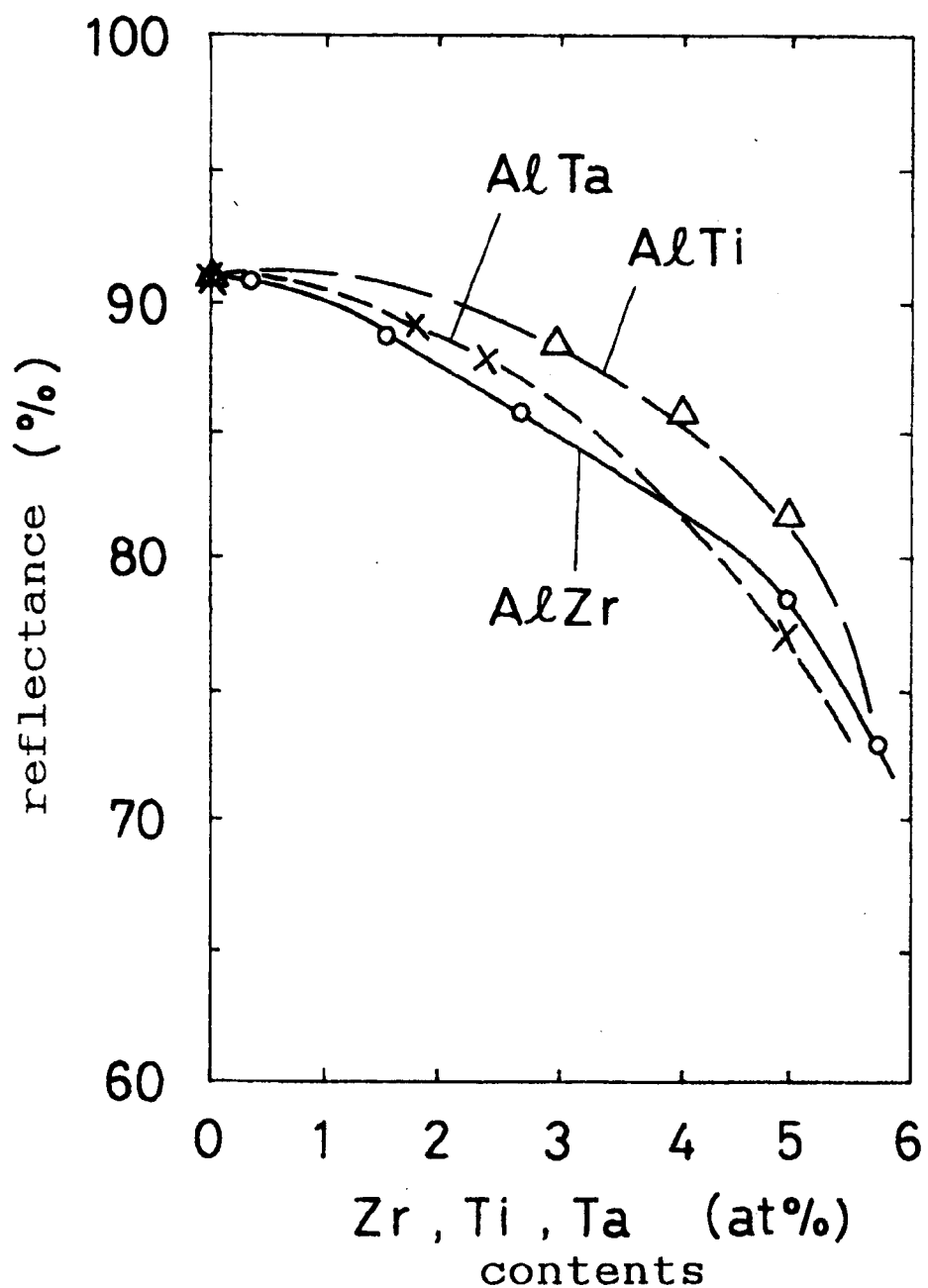
FIG. 4 illustrates the relationship among the Zr, Ti, and Ta contents and the reflectance in the Al alloy film in the first embodiment of the present invention.
Figure 5:
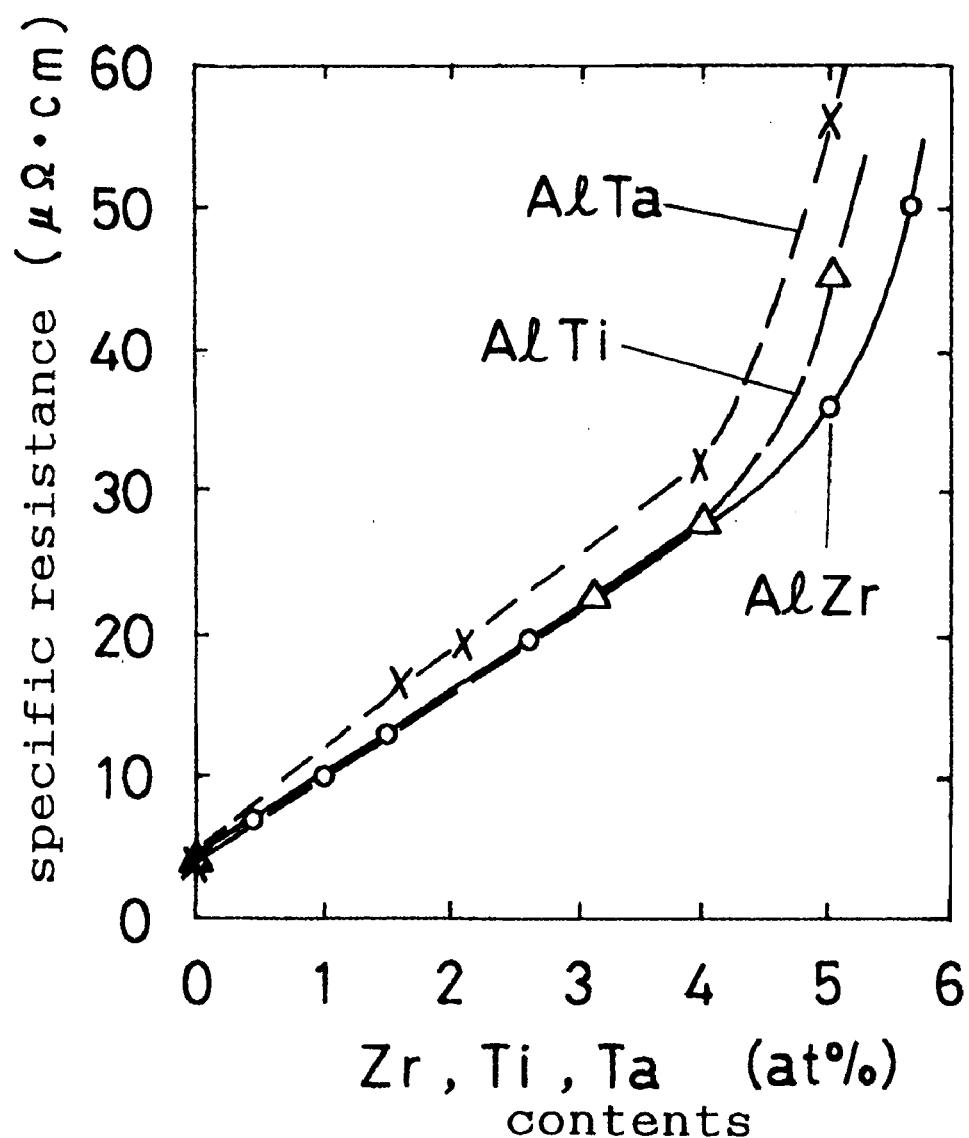
FIG. 5 illustrates the relationship among the Zr, Ti, and Ta contents and the resistance in the Al alloy film in the first embodiment of the present invention.

This test was carried out to measure the reflectance of a sample formed just like in the test 1 against a strong visibility light having a wavelength of 555 nm. In addition, the specific resistance of the sample was also measured with the 4-probe method. FIG. 4 shows the reflectance test result and FIG. 5 shows the specific resistance test result.

When the content of each of Zr, Ti, and Ta is increased, the reflectance of the sample is reduced and the specific resistance is increased. Especially, when the content of each of Zr, Ti, and Ta is over 5 at %, the reflectance drops sharply and the specific resistance rises sharply. From this result, it will be understood that the content of each of Zr, Ti, and Ta should be within 5 at % to obtain a reflection type liquid crystal display apparatus having a low wiring resistance and a less resistance variability, as well as high reflectance display electrodes. This effect can also be obtained when the alloy contains two or more of Zr, Ti, and Ta components concurrently and the total amount of the contents is within 5 at %.

According to the tests 1 and 2 described above, the Al alloy should preferably contain at least one of Zr. Ti, and Ta components by 0.1 at % to 5 at %. When the alloy is composed so, it is possible to improve the resistance to stress migration, the resistance to electro-migration, and the resistance to corrosion of the Al alloy material itself, and accordingly, it is possible to obtain a reflection type liquid crystal display apparatus with low wiring resistance and high reflectance display electrodes.

In the first embodiment, a substrate on which no thin film active element such as a transistor is formed was used. However, thin film active elements may be formed on the substrate by making (1) the display electrodes 20 and 21 on the lower substrate, (2) an electrode 100a for connecting an electronic part 25 used to drive the liquid crystal cell, and (3) an electrode 100b therebetween, of a two-layer film (Ti and Al alloy).

Although an $SiO_2$ film formed soda-lime glass substrate was used in the first embodiment, a non-alkali glass substrate and a liquid crystal film substrate may be used instead of the glass substrate.

Although, the exposed portion of the electrode 100b between (1) the electrode 100a for connecting the electronic part used to drive the liquid crystal cell and (2) the display electrodes 20 and 21 is covered with acrylic resin 22 in the first embodiment, another resin such as silicon resin may be used to cover the portion. The resin, however, should preferably be an acrylic one that can prevent penetration of water so as to improve the resistance to electro-migration.

Although mirror surface metallic reflecting electrodes are used and a scattering film is disposed on the upper substrate in the first embodiment, scattering type electrodes may be employed as the metallic reflecting electrodes.

Although a monochrome reflection type liquid crystal display apparatus was used in the first embodiment, the apparatus may be replaced with a color reflection type liquid crystal display apparatus.

Although the STN mode liquid crystal was used in the first embodiment, the liquid crystal may be replaced with another liquid crystal mode such as the TN mode, the PCGH mode, etc. thereby to compose the object reflection type liquid crystal display apparatus whose polarizing plate and polymer molecular film are adjusted to the liquid crystal mode.

Hereunder, the same numerals will be given to the same configuration items as those in the first embodiment.

(Second Embodiment)

FIG. 6 is a cross sectional view of the reflection type liquid crystal display apparatus in the second embodiment. The reflection type liquid crystal display apparatus in this second embodiment is composed almost in the same way as that in the first embodiment except that the COG method is used to mount the electronic part 25 used to drive the liquid crystal cell instead of the TAB method in the first embodiment.

In other words, the printed board 26 on which an electronic part (not illustrated) is mounted, the flexible board 29, and the LSI chip 25 are used and the printed board 26 is connected to the flexible board 29, as well as the electrodes 20 and 21 of the liquid crystal cell are connected to the flexible board 29 using an anisotropic conductive binding material 23. In addition, the electrodes 20 and 21 of the liquid crystal cell are connected to the LSI chip 25 using the anisotropic binding material 23. The electronic part (not illustrated) and the LSI chip 25 are used to drive the liquid crystal cell. Then, the electrodes 200b and 200c formed between (1) the electrode 200a to which the flexible board 29 is connected and (2) the display electrodes are covered with acrylic resin 22 so as not to be exposed.

Also in this configuration in the second embodiment, it was possible to obtain a normally black mode reflection type liquid crystal display apparatus that can display black as an achromatic color at a low reflectance, white as an achromatic color at a high reflectance, and vary the display from black to white as an achromatic color while the display is driven at a simple matrix of a 1/240 duty ratio.

Furthermore, as described in the first example and tests 1 and 2, the same effects can also be obtained in the metallic reflecting electrodes of the reflection type liquid crystal display apparatus composed in this second embodiment. And, the Al alloy should preferably contain at least one of Zr. Ti, and Ta components by 0.1 at % to 5 at %. When the alloy is composed so, it is possible to improve the resistance to stress migration, the resistance to electro-migration, and the resistance to corrosion of the Al alloy material itself, and accordingly, it is possible to obtain a reflection type liquid crystal display apparatus with low resistance wiring and high reflectance display electrodes.

Although a substrate on which no thin film active element such as a transistor is formed is used in the second embodiment, thin film active elements may be formed on the substrate if a two-layer film composed of Ti and Al alloy is used for (1) the display electrodes 20 and 21 on the lower substrate, (2) an electrode 200a for connecting an electronic part 29 used to drive the liquid crystal cell, and (3) electrodes 200b and 200c therebetween.

Although an $SiO_2$-film-formed soda-lime glass substrate is used in the second embodiment, a non-alkali glass substrate and a liquid crystal film substrate may be used instead of the glass substrate.

Although the exposed portions of the electrodes 200b and 200c between (1) the electrode 200a for connecting the electronic part used to drive the liquid crystal cell and (2) the display electrodes 20 and 21 are covered with acrylic resin 22 in the the second embodiment, another resin such as silicon resin may be used to cover the portions. The resin, however, should preferably be an acrylic one that can prevent penetration of water so as to improve the resistance to electro-migration.

Although mirror surface metallic reflecting electrodes are used and a scattering film is disposed on the upper substrate in the second embodiment, scattering type electrodes may be employed as the metallic reflecting electrodes.

Although a monochrome reflection type liquid crystal display apparatus is used in the second embodiment, the apparatus may be replaced with a color reflection type liquid crystal display apparatus.

Although the STN mode liquid crystal is used in the second embodiment, the liquid crystal may be replaced with another liquid crystal mode such as the TN mode, the PCGH mode, etc. thereby to compose the object reflection type liquid crystal display apparatus whose polarizing plate and polymer molecular film are adjusted to the liquid crystal mode.

According to the reflection type liquid crystal display apparatus of the present invention composed as described above, the resistance to stress migration, the resistance to electro-migration, and the resistance to corrosion of the display apparatus can be improved significantly.

If electrodes are to be formed on the two $SiO_2$-film-formed soda-lime glass substrates, low price glass substrates can be used thereby to suppress an increase of the manufacturing cost.

If at least one of the Zr, Ti, and Ta components is contained by 0.1 at % to 5 at % in the Al alloy, it is possible to improve the resistance to stress migration, the resistance to electro-migration, and the resistance to corrosion in the Al alloy material itself of the metallic reflecting electrode. In addition, the reflection type liquid crystal display apparatus can reduce the wiring resistance and increase the reflectance of the display electrodes.

Furthermore, if the exposed portion of each of the electrodes formed between (1) an electrode to which an electronic part is connected and (2) each display electrode is covered with acrylic resin, the reflection type liquid crystal display apparatus can improve the resistance to stress migration, the resistance to electro-migration, and the resistance to corrosion on the surface of the exposed portion of the metallic reflecting electrode, as well as between electrode patterns.

What is claimed is:

1. A reflection type liquid crystal display apparatus comprising:

a liquid cell having an upper substrate having an electrode pattern formed with transparent electrodes; a lower substrate opposed to said upper substrate and having an electrode pattern formed with metallic reflecting electrodes; an orientation film formed on each of said two electrode patterns; and containing liquid crystal between said upper and lower substrates; and an electronic part connected to said liquid crystal cell and used to drive said liquid crystal cell, wherein each of said metallic reflecting electrodes is a two-layer film composed of Ti and Al alloy and formed on said lower substrate wherein said Al alloy contains at least one of Zr, Ti, and Ta components and the content of said Al alloy component is within 0.1 at % to 5 at %.

2. A reflection type liquid crystal display apparatus as defined in claim 1, wherein a conductor portion used to connect said liquid crystal cell to said electronic part is an extension of said metallic reflecting electrode, and at least part of said extension is covered with a predetermined resin so that none of said extension is exposed.

3. A reflection type liquid crystal display apparatus as defined in claim 2, wherein said upper and/or lower substrate is composed of soda-lime glass on which an $SiO_2$ film is formed and said electrode pattern is formed on said $SiO_2$ film.

4. A reflection type liquid crystal display apparatus as defined in claim 1, wherein said predetermined resin is acrylic resin.

5. A reflection type liquid crystal display apparatus as defined in claim 2, wherein said predetermined resin is acrylic resin.

6. A reflection type liquid crystal display apparatus as defined in claim 3, wherein said predetermined resin is acrylic resin.

* * * * *